US009621679B2

(12) United States Patent
Kawagata et al.

(10) Patent No.: US 9,621,679 B2
(45) Date of Patent: Apr. 11, 2017

(54) OPERATION TASK MANAGING APPARATUS AND METHOD

(71) Applicant: FUJITSU LIMITED, Kawasaki-shi (JP)

(72) Inventors: Ryota Kawagata, Kawasaki (JP); Jun Yoshii, Kawasaki (JP); Shotaro Okada, Kawasaki (JP); Toru Kitayama, Kawasaki (JP); Akinobu Takaishi, Kawasaki (JP); Toshitsugu Mori, Kawasaki (JP); Yukihiro Takeuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 13/773,751

(22) Filed: Feb. 22, 2013

(65) Prior Publication Data

US 2013/0232192 A1 Sep. 5, 2013

(30) Foreign Application Priority Data

Mar. 1, 2012 (JP) ................................. 2012-045983

(51) Int. Cl.
*H04L 29/06* (2006.01)
*G06Q 10/06* (2012.01)

(52) U.S. Cl.
CPC ............. *H04L 67/42* (2013.01); *G06Q 10/06* (2013.01); *G06Q 10/0633* (2013.01);
(Continued)

(58) Field of Classification Search
CPC ............. G06Q 10/06; G06Q 10/06311; G06Q 10/0635; G06Q 10/0633; G06Q 10/06316; G06Q 10/063118; H01L 21/67276
See application file for complete search history.

(56) References Cited

U.S. PATENT DOCUMENTS 6,415,259 B1 * 7/2002 Wolfinger et al. ........... 705/7.13
8,027,862 B2 9/2011 Sakurai et al.
(Continued)

FOREIGN PATENT DOCUMENTS

JP 2007-328712 12/2007
JP 2008-129825 A 6/2008
JP 2009-48580 A 3/2009

OTHER PUBLICATIONS

European Office Action dated Nov. 18, 2015 for corresponding European Patent Application No. 13155922.1, 5 pages.
(Continued)

*Primary Examiner* — Chirag R Patel
(74) *Attorney, Agent, or Firm* — Fujitsu Patent Center

(57) ABSTRACT

A server including an input device receiving information, an output device generating output information, a memory, and a processor utilizing the memory.
The processor executes a process including receiving the information of an operations task including tasks having device and human tasks, and an order of the tasks; determining an operating time of each of the tasks based on a time determination rule; generating process definitions having the determined operating time associated with a corresponding one of the tasks; extracting, based on the process definitions and an analysis rule, one of a dependence relationship between the tasks, a risk in the dependence relationship between the tasks, and a risk in each of the tasks; and generating the output information for visually outputting one of the dependence relationship between the tasks, the risk in the dependence relationship between the tasks, and the risk in the each of the tasks.

18 Claims, 14 Drawing Sheets

(52) U.S. Cl.
CPC ... *G06Q 10/0635* (2013.01); *G06Q 10/06316* (2013.01); *G06Q 10/063118* (2013.01)

(56) References Cited

U.S. PATENT DOCUMENTS

| | | | | |
|---|---|---|---|---|
| 8,572,618 | B2 * | 10/2013 | Kand et al. | 718/102 |
| 8,595,041 | B2 * | 11/2013 | Schmidt | 705/7.11 |
| 2010/0030609 | A1 * | 2/2010 | Ramanathan | G06Q 10/06 705/7.28 |
| 2010/0287017 | A1 * | 11/2010 | Araki | G06Q 10/06 705/7.28 |

OTHER PUBLICATIONS

Japanese Office Action mailed on Sep. 8, 2015 for corresponding Japanese Patent Application No. 2012-045983, with Partial English Translation, 4 pages.

* cited by examiner

FIG.11

| PROCESS DEFINITION NAME | NODE NAME | START TIME | END TIME | ASSOCIATED PROCESS DEFINITION NAME (PARENT) | ASSOCIATED NODE NAME (PARENT) | CONTRADICTORY CONTENT |
|---|---|---|---|---|---|---|
| PROCESS DEFINITION A | OPERATOR A TASK APPLICATION 1 | 08:10 | 08:30 | – | – | – |
| PROCESS DEFINITION A | SERVER w TERMINATING TASK 2 | 08:35 | 08:50 | – | – | – |
| PROCESS DEFINITION A | SERVER w ACTIVATING TASK 2 | 08:55 | 09:10 | – | – | – |
| PROCESS DEFINITION B | OPERATOR A TASK APPROVAL 4 | 18:20 | 08:30 | PROCESS DEFINITION A | OPERATOR A TASK APPLICATION 1 | TASK APPLICATION 1 OVERLAPS TASK APPROVAL 4 WHILE SYNCHRONIZATION |
| PROCESS DEFINITION C | VM1 OF SERVER w ACTIVATING TASK 3 | 08:40 | 08:50 | PROCESS DEFINITION A | SERVER w TERMINATING TASK 2 | VM1 ACTIVATING TASK IS CONDUCTED WHILE TERMINATING SERVER w (CONTRADICTION) |

FIG.12

| PROCESS DEFINITION NAME | ESTIMATED START TIME | TASK CONTENT | ASSOCIATED PROCESS DEFINITION | TASK CONTENT | MESSAGE INFORMATION | |
|---|---|---|---|---|---|---|
| PROCESS DEFINITION A | 13:00 | OPERATOR 1 TASK APPLICATION | PROCESS DEFINITION B | OPERATOR 1 MONITORING SERVER POWER | ALERT! THERE ARE TWO OR MORE TASKS AT THE SAME TIME | 1202 |
| | 13:10 | ADMINISTRATOR 2 TASK APPROVAL | | | | |
| | 13:15 | BACK UP DATA OF SERVER x | PROCESS DEFINITION D | SERVER x DELETING REDUNDANT DATA | | |
| | 13:45 | TERMINATING SERVER x | PROCESS DEFINITION D | SERVER x TRANSMITTING MAIL TO ADMINISTRATOR | ALERT! THERE IS TASK CONTRADICTION IN SERVER x | 1204 |
| | 14:00 | ACTIVATING SERVER y | | | | |

OPERATION TASK MANAGING APPARATUS AND METHOD

CROSS-REFERENCE TO RELATED APPLICATIONS

This patent application is based upon and claims the benefit of priority of the prior Japanese Patent Application No. 2012-045983 filed on Mar. 1, 2012, the entire contents of which are incorporated herein by reference.

FIELD

The embodiments discussed herein relate to an operations task management system and a method.

BACKGROUND

A related-art schedule management technology includes management of job progress statuses and changes of job schedules.

For example, there are various types of software as project management tools for managing various jobs. The project management tool may be utilized for managing various jobs when an information system development project is carried out. For example, the project management tool may be configured to graph and display progress statuses of tasks in each of the processes of the project, such that a user may be able to grasp a progress status of the entire project.

However, an operations task that is carried out in an environment such as a data center maybe complicated, because the operations task involves combinations of human-controlled tasks and device-controlled tasks. In this case, the management of such an operations task may be complicated. Further, in such an operations system, plural operations tasks run in parallel. The plural operations tasks may be closely related to one another. Alternatively, the plural operations tasks maybe entirely unrelated to one another. Further, with the recent progress in the virtual technology, even when plural jobs appear to be entirely unrelated to one another, plural virtual machines may be running on an identical server. In this case, the jobs may mutually affect one another in an operating environment.

Thus, in the environment such as the data center, an operations task utilizing computational resources includes combinations of device-controlled tasks and human-controlled tasks (e.g., an approval task or verification of device-controlled task) . In this case, an operator generally carries out the above tasks by following a task procedure instruction sheet.

The device-controlled tasks stated in the task procedure instruction sheet may be automated with a job management tool such that the device-controlled tasks are managed by the job management tool. However, the human-controlled tasks are not managed by the job management tool. Further, the project management tool is designed for basically managing the human-controlled jobs. Hence, the project management tool is not suited for managing the jobs associated with the device-controlled tasks.

Accordingly, numerous parts of the operations tasks having a combination of human-controlled tasks and the device-controlled tasks are actually conducted by human intervention. When the tasks that need to be managed drastically grow in number or scale, it may be laborious and may take a long time to trace and manage all the operations tasks. Further, when all the operations tasks are managed by human intervention, inconspicuous risks of the operations tasks may be overlooked. In addition, the downtime may be propagated due to improper handling of unexpected system failures. Accordingly, it may often be difficult to grasp what kind of effect may be imposed on the entire operations tasks including human-controlled tasks when the device-controlled task is delayed due to some kind of failure.

There is disclosed a technology of generating a chronological order pattern associated with a sequential order of task processes from event logs. The event logs indicate event records that are arranged in a chronological order, and the event records constitute a processing history of operations tasks. This technology may be applied to a system that analyses a job based on historical information of tasks. Specifically, since the technology is capable of extracting the historical information of tasks for each of the projects, the technology may be applied to a system having mixed historical information of plural jobs (see Patent Document 1).

RELATED-ART DOCUMENT

Patent Document

Patent Document 1: Japanese Laid-Open Patent No. 2007-328712

SUMMARY

According to an aspect of an embodiment, there is provided a server including an input device configured to receive information of an operations task including a plurality of tasks including a device task and a human task and an order of the plurality of the tasks, an output device configured to generate output information for visually outputting at least one of a dependence relationship between the tasks and a risk, a memory, and a processor utilizing the memory and configured to execute a process including receiving the information of the operations task including the plurality of tasks including the device task and the human task, and the order of the plurality of the tasks; determining an operating time of each of the tasks based on a time determination rule; generating a plurality of process definitions each having the determined operating time in association with a corresponding one of the tasks including the device task and the human task; extracting, based on the process definitions and an analysis rule, at least one of a dependence relationship between the tasks, a risk in the dependence relationship between the tasks, and a risk in each of the tasks; and generating the output information for visually outputting the at least one of the dependence relationship between the tasks, the risk in the dependence relationship between the tasks, and the risk in the each of the tasks.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIG. 11 is a table indicating a dependence relationship associated with nodes and risks according to an embodiment;

FIG. 12 is a table illustrating message information according to an embodiment.

DESCRIPTION OF EMBODIMENTS

Figure 1:
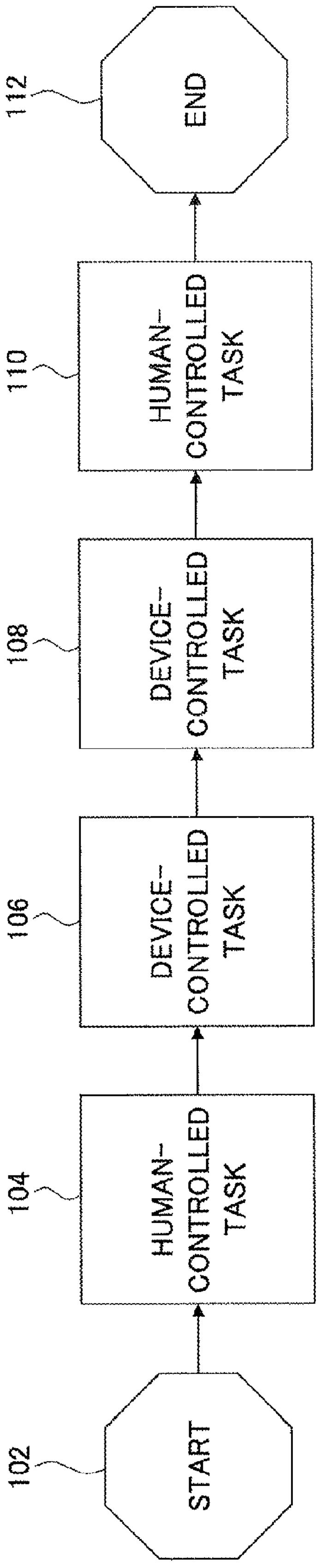
FIG. 1 is a diagram illustrating an example of a process definition indicating an operations task.

FIG. 1 illustrates an example of a process definition indicating an operations task. In an environment such as a data center, a combination of operations tasks performed by humans (hereinafter referred to as "human-controlled tasks") and operations tasks performed by a device (hereinafter referred to as "device-controlled tasks") constitutes one workflow. In this specification, a workflow including the human-controlled tasks and the device-controlled tasks is called a "process definition". Each of elements corresponding to individual operations tasks within the process definition is called a "node".

In FIG. 1 the process definition starts with a start node 102. The start node 102 may include a start time (time/day/month/year). A human-controlled task 104 subsequent to the start node 102 indicates an operations task performed by humans. Note that a node corresponding to the human-controlled task is hereinafter referred to as a "human-controlled node". The human-controlled node includes information associated with an operator and task contents (e.g., application, approval, and verification). Alternatively, the above information may be input by an operator. Further, a system may be configured to accumulate predetermined default values corresponding to information such as a time it takes to perform a task, an operations task start time, and an operations task end time, or accumulate mean values obtained by averaging the information (i.e., the time it takes to perform a task, the operations task start time, and the operations task end time) of the previously performed same tasks, so as to automatically set the default values or the mean values as the above information.

A device-controlled task 106 subsequent to the human-controlled task 104 indicates an operations task performed by a device (a node corresponding to the device-controlled task is referred to as a "device-controlled node"). The device-controlled node includes information associated with server specifying information and processing contents (e.g., server activation, server termination, and activation of a virtual machine (VM)). The above information maybe input by an operator when the process definition is determined. Further, a system may be configured to accumulate predetermined default values corresponding to information such as a time it takes to perform a task, an operations task start time, and an operations task end time, or accumulate mean values obtained by averaging the information (i.e., the time it takes to perform a task, the operations task start time, and the operations task end time) of the previously performed same tasks, so as to automatically set the default values or the mean values as the above information. Subsequence configurations of a device-controlled task 108 and a human-controlled task 110 may be similar to those of the device-controlled task 106 and the human-controlled task 104, respectively. An end node 112 may include an estimated end time of the process definition.

Note that whether a task is a human-controlled or a device-controlled task may be classified based on the subject of the task. In other words, when the subject of an operations task is a human, the operations task is determined as the human-controlled task, whereas when the subject of an operations task is a device, the operations task is determined as the device-controlled task.

Figure 2:
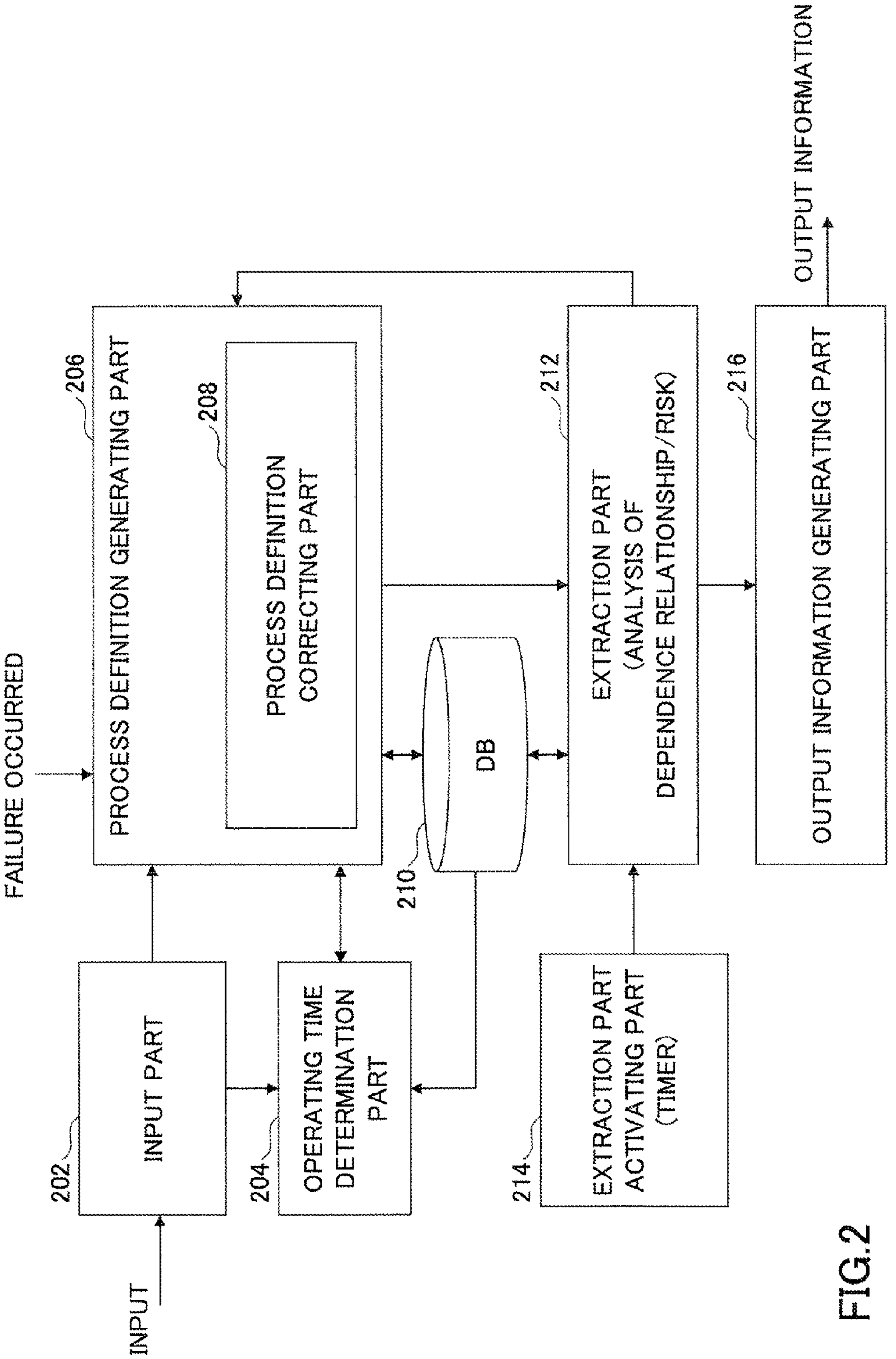
FIG. 2 is a block diagram of a system according to an embodiment.

FIG. 2 is a block diagram according to an embodiment. An input part 202 is configured to receive an operations task flow from an operator for generating a process definition (see FIG. 1). Initially, an estimated start time of the operations task is input into the input part 202 to create the start node 102. Subsequently, information on each of the nodes of the process definition is input into the input part 202. When the operations task is the human-controlled task, information associated with an operator and task content (e.g., application, approval, and verification) may be input into the input part 202. When, on the other hand, the operations task is the device-controlled task, information associated with server specifying information and processing content (e.g., server activation, server termination, and activation of a virtual machine (VM)) may be input into the input part 202.

An operating time determination part 204 is configured to determine an operating time of each of the nodes. For example, the operating time determination part 204 initially transmits an inquiry as to whether there are task records of the past three years (i.e., operating records of the process definition) to a database (DB) 210. The task records may be utilized so as to accurately estimate an operating time of a node subjected to analysis.

When there are task records of the past three years, the mean value of past three year's operating time records may be determined as the operating time of the node subjected to analysis. When there are no task records, a predetermined default value may be determined as the operating time of the node subjected to analysis. The accuracy of the estimated operating time may be increased as more records are accumulated in the DB 210. The DB 210 is a specific example of a storage part.

Note that correction based on an environmental load ratio may be added to the estimated operating time. Specifically, in a case of the device-controlled node, a server may be simultaneously executing plural operations task programs. Further, one server may be running plural virtual machines (VMs). The environmental load ratio is a correction value (additional hours) computed based on workload (a workload level). The correction value (additional hours) maybe computed by applying an estimated operating time to a predetermined computational formula according to a machine performance and the workload level, and the computed correction value may be added to the operating time. Further, in a case of the human-controlled node, workload (a workload level) may be different, for example, between a mail-writing task and a monitoring task. Accordingly, the correction value (additional hours) may be computed by applying an estimated operating time to a predetermined computational formula according to a workload level, and the computed correction value may be added to the operating time.

A process definition generating part 206 is configured to generate a process definition by computing information including an operations task start time and an operations task end time of each of the nodes utilizing an estimated value of the operating time received from the operating time determination part 204. The start time of the start node is given by an operator. Accordingly, the start times and the end times of subsequent nodes may be sequentially computed utilizing the corresponding operating time.

The generated process definition may be stored in the DB 210. Information of the process definition stored in the DB 210 may include information illustrated in a table recited in FIG. 11. Note that details of the table recited in FIG. 11 are described later.

The process definition generating part 206 includes a process definition correcting part 208. The process definition correcting part 208 is configured to correct the process definition in cooperation with the operating time determination part 204 when delay in the operations task is detected during regular operations task monitoring.

As noted earlier, the DB 210 may store the process definition. The DB 210 may also store previously obtained process records (i.e., past process records) so as to provide the accumulated data for determining an operating time. The DB 210 may separately store human-controlled task data and device-controlled task data. Data stored in the DB 210 may be formatted in a table (see FIG. 11). Note that a unique key that is assigned to each of the process definitions may be stored in the data of each of the nodes for determining which process definition each of the nodes is used by.

The DB 210 may further include a rule so as to detect contradiction of the operations tasks. For example, when an operations task to "activate server" and an operations task to "terminate server" are simultaneously executed during the same time, there may be a contradiction between the two operations tasks. The rule for the contradiction may be accumulated in the DB 210. Further, a threshold corresponding to the delay may be stored in the DB 210 for determining an allowable range of the delay in the operations task. In addition, the DB 210 may also accumulate types of previously occurred failures (i.e., failures occurred in the past) and restoration times for restoring the respective failures. Specifically the DB 210 may store a type of a failure and restoration time for restoring the failure every time a failure occurs. Further, the DB 210 may also store a default value of a restoration time in order to solve a new failure. The DB 210 may store other rules, thresholds, and default values utilized in each of the embodiments recited in the specification.

The extraction part 212 is, for example, configured to analyze the process definition by utilizing the analysis rule (e.g., the above past information, the thresholds, default values, contradiction rules and the like). Then, the extraction part 212 is configured to extract a dependence relationship between the nodes, and/or risks (e.g., presence of contradiction, and/or presence of delay). The information accumulated in the DB 210 is utilized for the analysis and the extraction.

The extraction part 212 may be activated by the output of the process definition generating part 206. A typical example of the activation by the output of the process definition generating part 206 may include the activation of the extraction part 212 when the input part receives new operations task information. The new operations task information is received to cause the process definition generating part 206 to generate a process definition. Then, the generated process definition is analyzed by comparing it with another process definition in the extraction part 212. As a result, the dependence relationships and the risk are extracted. Thus, the operator maybe able to check what kind of relationship the input operations task has between the process definitions, and whether there is any risk. The operator may revise the new operations task based on the above results.

Alternatively, the extraction part 212 may be regularly activated by an extraction part activating part 214. A typical example of the regular activation by extraction part activating part 214 includes the activation of the extraction part 212 at predetermined intervals by utilizing a timer of the extraction part activating part 214. Hence, the large-scale jobs in the data center or the like may be diagnosed regularly by the regular activation of the extraction part 212. The extraction part 212 may compare the information of the currently operating node with execution planned information. In this case, the extraction part 212 may determine, for example, the presence of a risk when the delay of a certain node is greater than a predetermined threshold. The extraction part 212 may then check how the risk adversely affects another process definition. As a result, the obtained risk information may be processed by an output information generating part 216 such that the output information generating part 216 outputs the risk information processed in a form comprehensible to the operator. The operator may take appropriate actions based on the above output.

Then, the output information generating part 216 may convert the extracted dependence relationship between the respective nodes, and/or the extracted risks into output information in the form comprehensible to the operator. Examples of the output information may include a tree structure (see FIG. 10B) or message information (see FIG. 12). The output information may be, for example, information to be displayed on a display, information to be printed by a printer, and information to be transmitted via Email.

Figure 3:
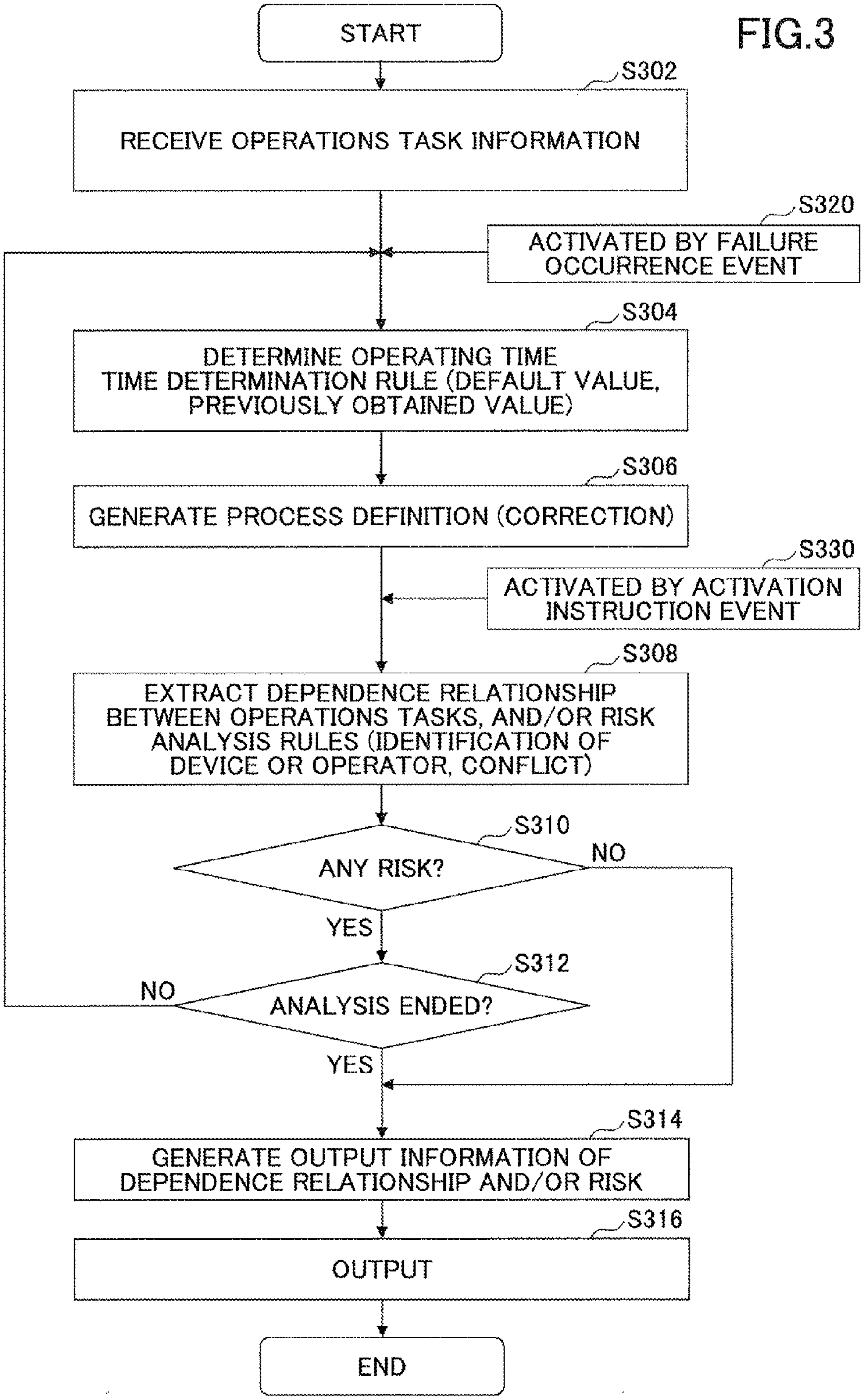
FIG. 3 is a flowchart according to an embodiment.

FIG. 3 is a flowchart according to an embodiment.

In step S302, operations task information is received. Specifically, an operations task start time is input in step S302. When the operations task is a human-controlled task, a name of an operator, the content of the task, and the like are input. When the operations task is a device-controlled task, information specifying a server, the content of the task, and the like are input.

In step S304, an operating time of each of the operations tasks is determined based on a predetermined time determination rule. The predetermined time determination rule may be the mean of the previously obtained values, a default value, an environmental load ratio, a workload level, or the like as described above.

In step S306, a process definition is generated. Alternatively, as described above, the generated process definition may be corrected.

The operations task start time and the operations task end time of each of the nodes are computed based on the determined operating time, and the computed values for the respective operations task start time and the operations task end time are added to the process definition.

In step S308, a dependence relationship between the operations tasks, and/or risks are extracted. As described above, predetermined analysis rules may appropriately be utilized for extracting the dependence relationship and/or the risks. Note that the dependence relationship may be analyzed by the nodes associated with the same server, or the nodes associated with the same operator.

In step S310, whether there is any risk is determined. When there is no risk ("NO" in step S310), step S314 is processed. When, on the other hand, there is some risk ("YES" in step S310), step S312 is processed.

In step S312, whether all the analyses are finished is checked. When all the analyses have not been finished ("NO" in step S312), step S304 is processed (back to step S304) . In this case, the risk is present, and hence, impact caused by the risk may need to be examined. Accordingly, step S304 is carried out again to examine the process definitions having impact, and to recompute the operating time of each of the operations. Then, a series of processes subsequent to step S304 is repeatedly carried out. In step S312, when all the analyses are finished (when a new risk is not detected any more in unanalyzed process definitions), step S314 is processed.

In step S314, output information of the dependence relationship between the operations tasks and/or risks is generated.

In step S316, output information of the dependence relationship and/or the risks is generated.

Further, step S320 is activated by an event where a failure occurs (an occurrence of a failure). When the failure accidentally occurs, a failure restoration time is estimated in step S304. The failure restoration time may be estimated based on the mean of the restoration time information corresponding to the previously occurred similar failures. Alternatively, the failure restoration time may be estimated based on a predetermined default value, or the failure restoration time may be estimated based on a value set or corrected by the operator.

Step S330 is activated by an event of activation instruction for monitoring. Step S308 may be operated by the activation instruction, and whether the currently executed node is delayed may be determined. Whether the currently executed node is delayed may be determined by comparing the delay time with a predetermined threshold. When the delay time exceeds the predetermined threshold, it is determined that there is some risk. Processes subsequent to step S330 are similar to the those described above, and the risk impact check may also be conducted in a manner similar to those described above.

Figure 4:
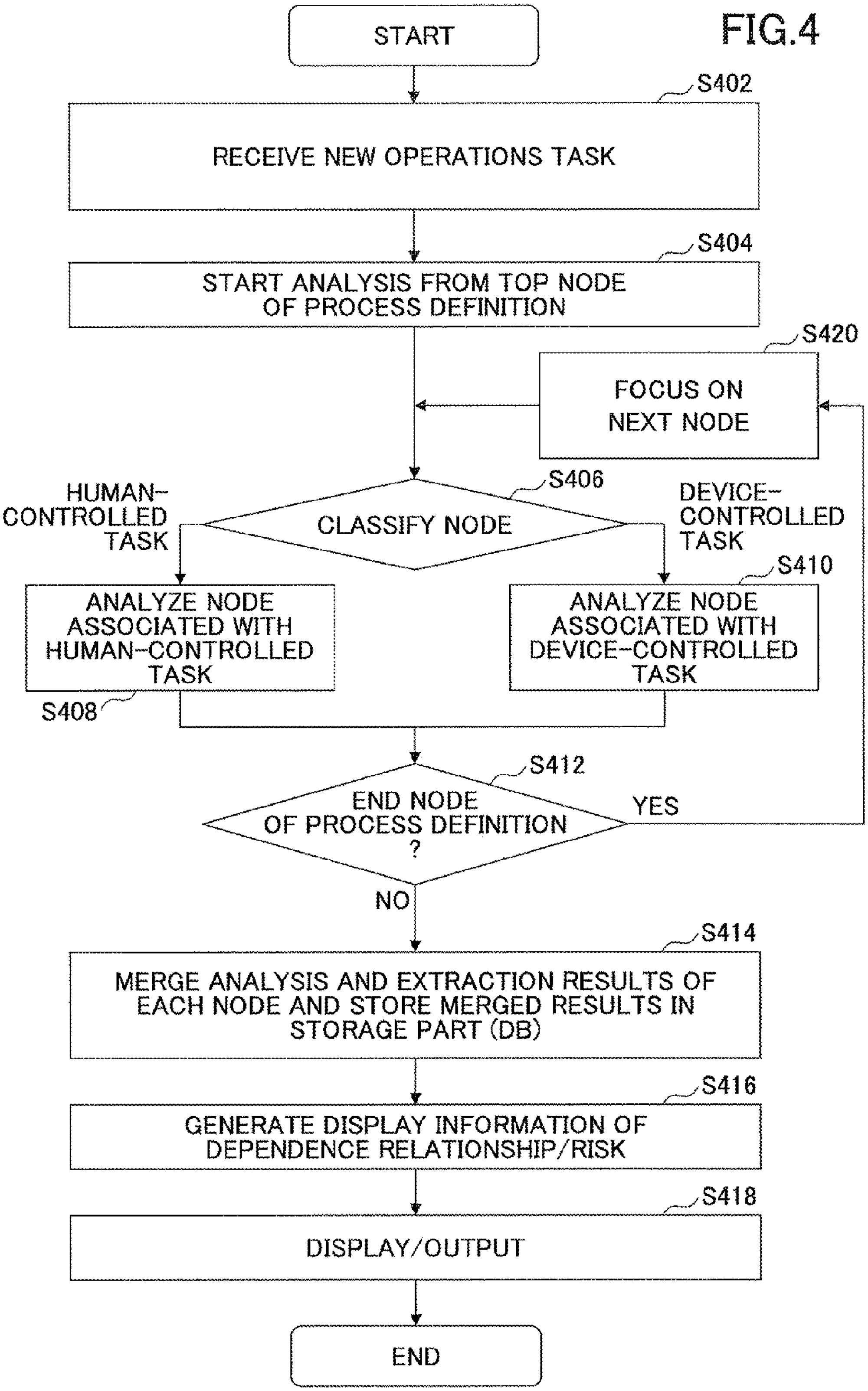
FIG. 4 is a diagram illustrating an entire flowchart according to an embodiment when a new operations task is accepted.

FIG. 4 is a diagram illustrating an entire flow of an embodiment when a new operations task is received.

In step S402, a new operations task is received. Then, a process definition is generated.

In step S404, a top node of the received process definition is selected. Then, an analysis of the top node is started.

In step S406, the node is classified. Specifically, the node is classified into one of the human-controlled task and the device-controlled task.

In step S408, the node associated with the human-controlled task (hereinafter also called a "human-controlled node") is analyzed. Details of the analysis of the node associated with the human-controlled task are described later with reference to FIG. 5.

In step S410, the node associated with the device-controlled task (hereinafter also called a "device-controlled node") is analyzed. Details of the analysis of the node associated with the human-controlled task are described later with reference to FIG. 6.

In step S412, it is determined whether the node is an end node of the process definition. When the node is not the end node of the process definition ("NO" in step S412), step S406 is processed (back to step S406). When the node is the end node of the process definition ("YES" in step S412), step S414 is processed.

In step S414, the analysis and extraction results of each of the nodes are merged and the merged results are stored in the storage part (DB). Note that in this case, the merged results of the node associated with the human-controlled task and the merged results of the node associated with the device-controlled task may be separately stored in different storage regions of the storage part (DB).

In step S416, output information of the dependence relationship/risks that includes the analysis and extraction results is generated.

In step S418, the output information is displayed on an output device such as a display.

Figure 5:
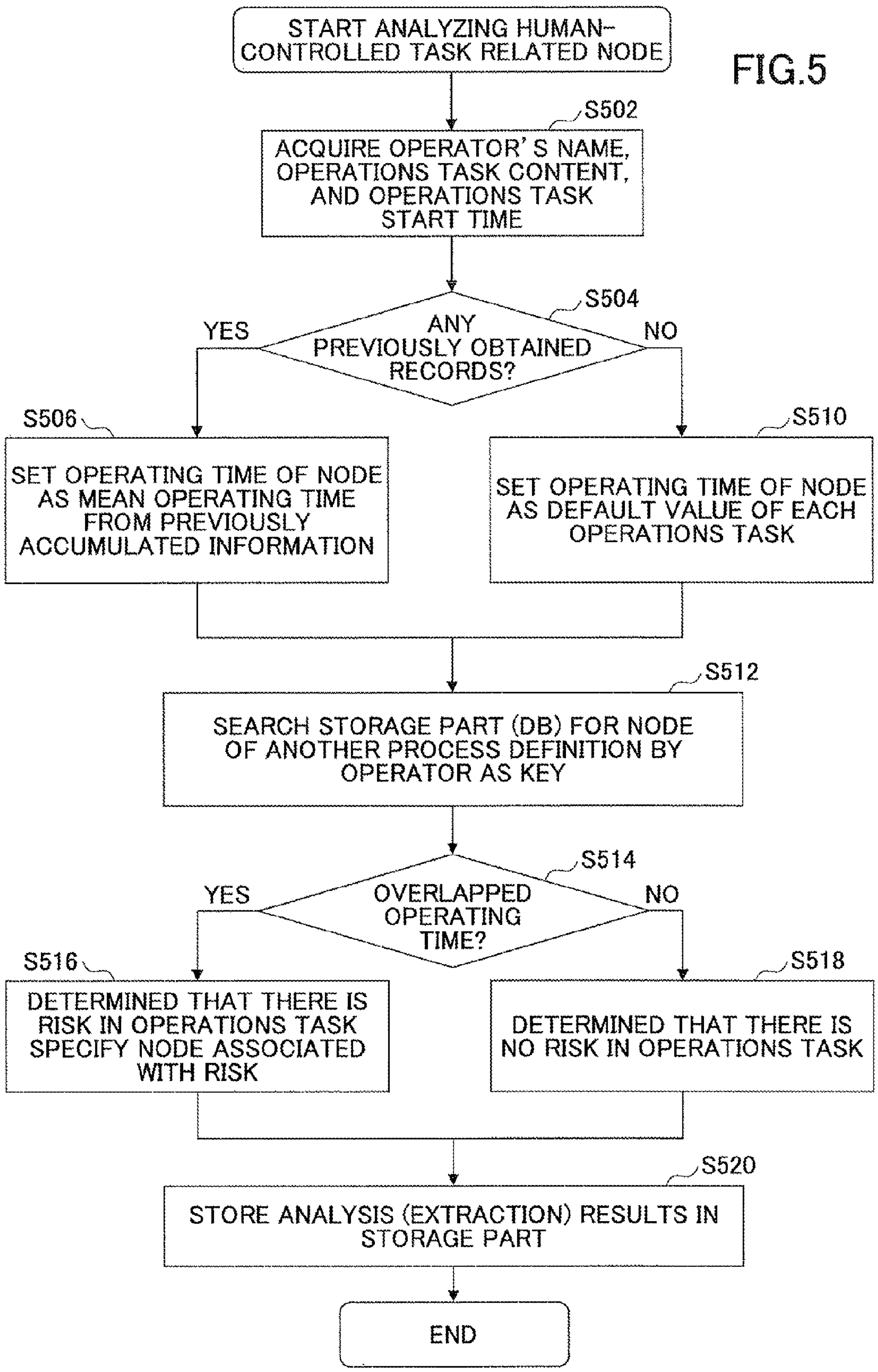
FIG. 5 is a diagram illustrating a flowchart according to an embodiment associated with an analysis of a node associated with a human-controlled task (a human node analysis)

FIG. 5 is a flowchart according to an embodiment illustrating the analysis of a node associated with a human-controlled task. Note that the procedure of FIG. 5 illustrates contents of the process in step S408 of FIG. 4.

In step S502, information on an operator, operations task content, and an operations task start time is acquired. The above information may be input by the operator.

In step S504, it is determined whether there are any information of previously obtained records in the DB 210 is determined based on the operator's information and the operations task content as keys. When there are previously obtained records in the DB 210 ("YES" in step S504), step S506 is processed. When there are no previously obtained records in the DB 210 ("NO" in step S510), step S510 is processed.

In step S506, an operating time for the current node may be set as the mean operating time computed based on the information previously accumulated in the DB 210.

Note that due to an operator of the node and workload (a workload level), the operating time may be corrected according to a predetermined rule.

In step S510, a default value of each of the operations tasks may be set as the operating time. The default value maybe determined for each of the operations tasks in advance, and the determined default values of the operations tasks may be stored in the DB 210. Note that when there is a new operations task item, the operator may be prompted to input a default value for the new operations task item.

In step S512, the storage part (DB) is searched by the operator's information acquired in step S502 as a key for anode of another process definition. As a result, all the nodes of another process definition associated with the same operator are extracted.

In step S514, it is determined whether there is an overlapped operating time between the extracted nodes.

When there is an overlapping operating time between the extracted nodes ("YES" in step S514), step S516 is processed. When there is no overlapping operating time between the extracted nodes ("NO" in step S514), step S518 is processed.

In step S516, it is determined that there is a risk in the operations task. That is, when the same operator is assigned to the different operations tasks (the overlapped operator assignment), it appears to be difficult for this operator to simultaneously conduct the assigned different operations tasks. The nodes associated with this risk are specified and stored.

In step S518, it is determined that there is no risk in the operations task. When there is no risk in the operations task, information indicating "no risk in the operations task" is not necessarily stored. Note that the node connection relationship may be utilized as the dependence relationship.

In step S520, the analyzed (extracted) results are stored in the storage part.

Figure 6:
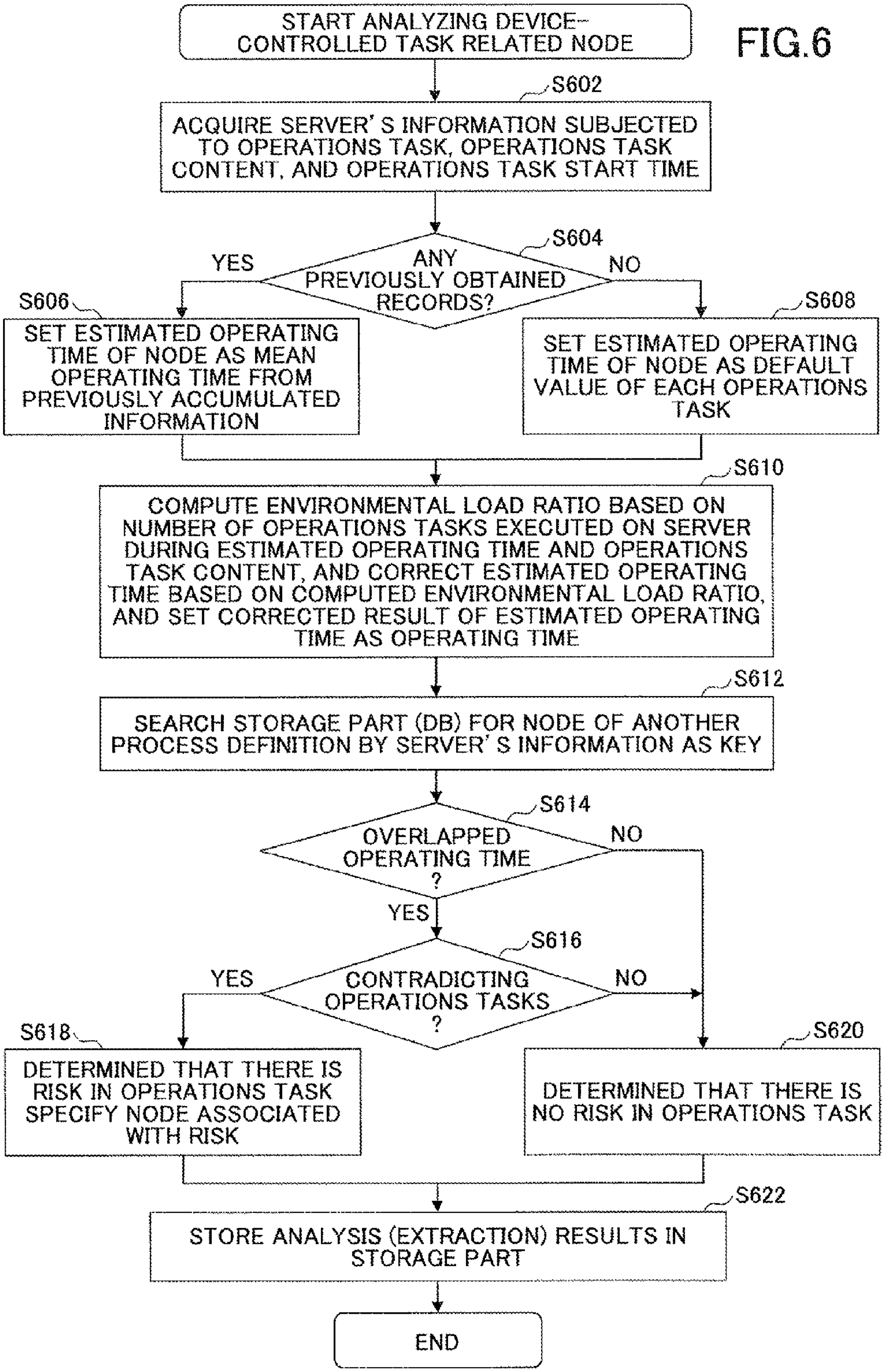
FIG. 6 is a diagram illustrating a flowchart according to an embodiment associated with an analysis of a device-controlled task (a device node analysis)

FIG. 6 is a flowchart according to an embodiment illustrating the analysis of a node associated with a device-controlled task. Note that the procedure of FIG. 6 illustrates content of the process in step S410 of FIG. 4.

In step S602, information on a server subjected to execution of an operations task (hereinafter simply called a "subject server"), operations task content, and an operations task start time is acquired. The above information may be input by the operator.

In step S604, it is determined whether there is any information of previously obtained records in the DB 210 based on the operator's information and the operations task content as keys. When there are previously obtained records in the DB 210 ("YES" in step S604), step S606 is processed. When there are no previously obtained records in the DB 210 ("NO" in step S604), step S608 is processed.

In step S606, an operating time for the current node may be set as the mean operating time computed based on the information previously accumulated in the DB 210.

In step S610, an environmental load ratio is computed based on the number of operations tasks executed on the subject server during an estimated operating time and the operations task content, and the estimated operating time is corrected based on the computed environmental load ratio, and the corrected result of the estimated operating time is set as the operating time. As described above, in a case of the device-controlled node, a server may be executing plural programs of operations tasks, simultaneously. Further, one server maybe running plural virtual machines (VMs). The environmental load ratio may be determined by incorporating these factors.

In step S612, the storage part (DB) is searched for a node of another process definition by the subject server's information as a key. As a result, all the nodes of another process definition associated with the same server are extracted.

In step S614, it is determined whether there is an overlapped operating time between the extracted nodes. When there is an overlapping operating time between the extracted nodes ("YES" in step S614), step S616 is processed. When there is no overlapping operating time between the extracted nodes ("NO" in step S614), step S620 is processed.

In step S616, it is determined whether the there is a contradiction between the operations tasks. For example, an operations task to "activate server" and an operations task to "terminate server" are not expected to be executed simultaneously, and therefore, no overlapping time is expected while performing the two operations tasks. These kinds of operations tasks are determined as mutually contradicting operations tasks that may be susceptible to risks. When the determination in step S616 is "NO", step S620 is processed. When the determination in step S616 is "YES", step S618 is processed.

In step S618, it is determined that there is a risk in the operations task. The nodes associated with this risk are specified.

In step S620, it is determined that there is no risk in the operations task.

In step S622, the analyzed (extracted) results are stored in the storage part.

So far, the processes when the new operations task is input are described with reference to FIGS. 4 to 6. In this case, how the newly input operations task is associated with another process definition, and/or whether there is any risk are presented to the operator. The operator may need to replan the new operations task based on the above results.

Note that as will be described later, when an accidental an occurrence of a failure is detected or a failure is detected by regular inspections, such failure may cause a chain of repercussions on other process definitions. Therefore, an impact analysis may need to be conducted. By contrast, the newly input operations task serves as pre-inspection, and hence, the impact analysis is not necessarily conducted in this case. It may be necessary to specify a dependence relationship between the existing process definition and the new operations task, and its expected failure occurring point of the dependence relationship so as to encourage reexamining the planning of the operations tasks. Further, the following impact analysis may also be conducted.

Figure 7:
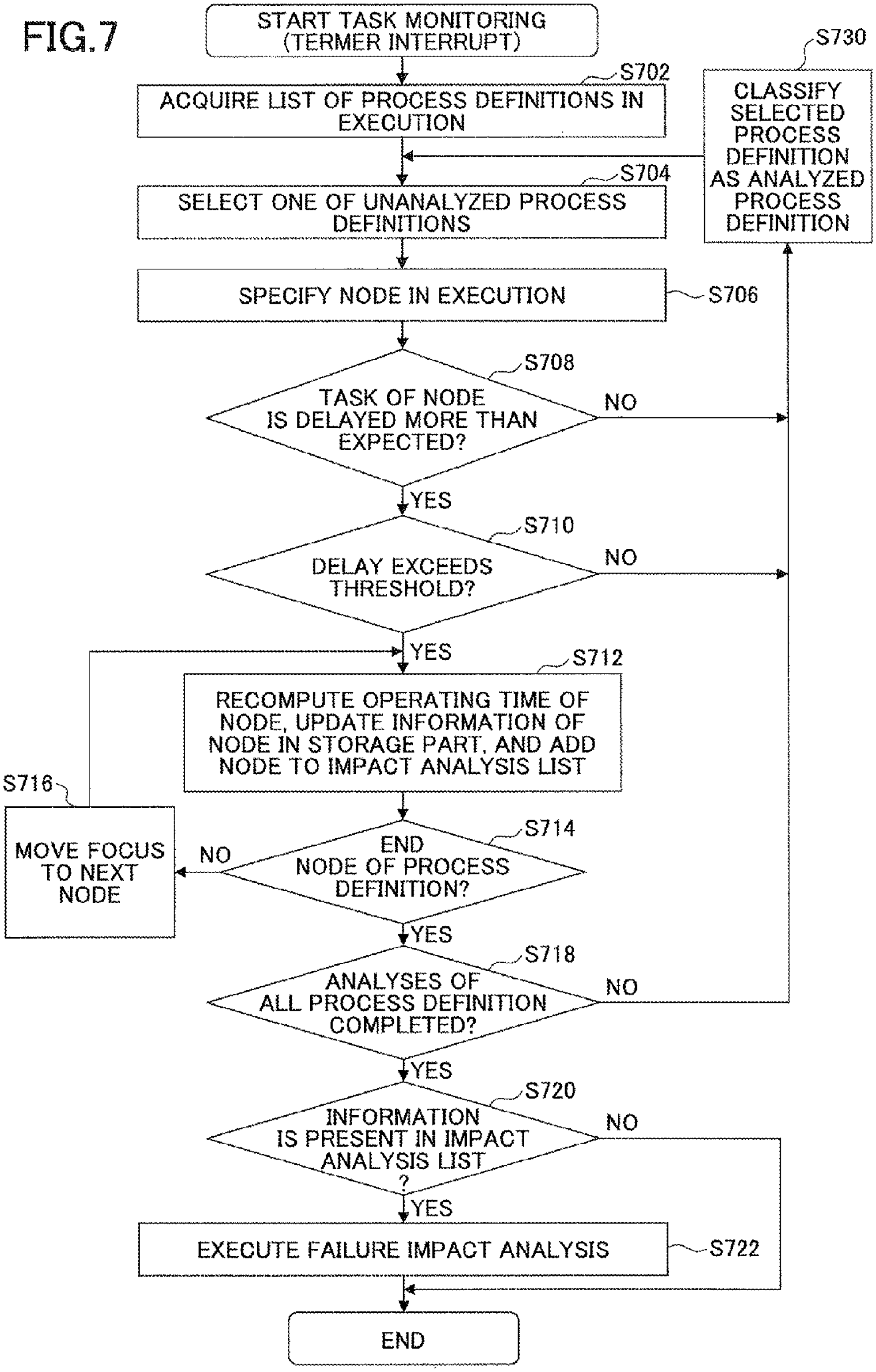
FIG. 7 is a diagram illustrating a flowchart according to an embodiment associated with task monitoring.

FIG. 7 is a flowchart according to an embodiment associated with task monitoring.

In step S702, a list of process definitions in execution is acquired.

In step S704, one of the unanalyzed process definitions is selected from the list of the process definitions in execution.

In step S706, a node currently in execution is specified from the selected process definition.

In step S708, it is determined whether the task of the node in execution is delayed further than expected. This determination may be based on the computation of the difference between the start time of the node in execution and the start time of the node described in the process definition. This is because the process definition in execution maybe terminated by the same delay as the delay of the start time. When the determination in step S708 is "NO", step S730 is processed. When the determination in step S708 is "YES", step S710 is processed.

In step S710, it is determined whether the computed delay exceeds a predetermined threshold. The predetermined threshold may be determined for each of the nodes. Alternatively, the predetermined threshold may be determined for each of the process definitions. Further, the predetermined threshold may be determined for each of the operations tasks. If the determination in step S710 is "YES", step S712 is processed. When the determination in step S710 is "NO", step S730 is processed.

In step S712, the operating time of the node is recomputed, the information of the node in the storage part is updated, and the node is added to an "impact analysis list". Since the delay of the operations task undesirably exceeds the predetermined threshold, the operating time of the node is recomputed, and the start time and the end time of the node are updated.

In step S714, it is determined whether the node is an end node of the process definition. When the determination in step S714 is "YES", step S718 is processed. When the determination in step S714 is "NO", step S716 is processed.

In step S716, a focus is moved to a next node, and step S712 is processed (back to step S712). By performing the above processes, the effect of the delay maybe applied to a subsequent node. Hence, the start times and the end times of the subsequent nodes may sequentially be updated to the end of the process definition.

In step S718, it is determined whether analyses of all the process definitions have been completed. When the determination in step S718 is "NO", step S730 is processed. When the determination in step S718 is "YES", step S720 is processed.

In step S730, the selected process definition is classified as the "analyzed" process definition, and step S704 is processed (back to step S704).

In step S720, it is determined whether the information is present in the impact analysis list. The presence of the information in the impact analysis list indicates that step S712 has already been processed. Further, this indicates that there are one more nodes having the delay of the operations task greater than the predetermined threshold in the monitoring task. When the determination in step S720 is "NO", the process is ended. When the determination in step S720 is "YES", step S722 is processed.

In step S722, a failure impact analysis is executed. That is, it may be necessary to analyze whether the detected delay of the node affect an operations task of a node in another process. Details of the impact analysis are described later with reference to FIG. 9.

Figure 8:
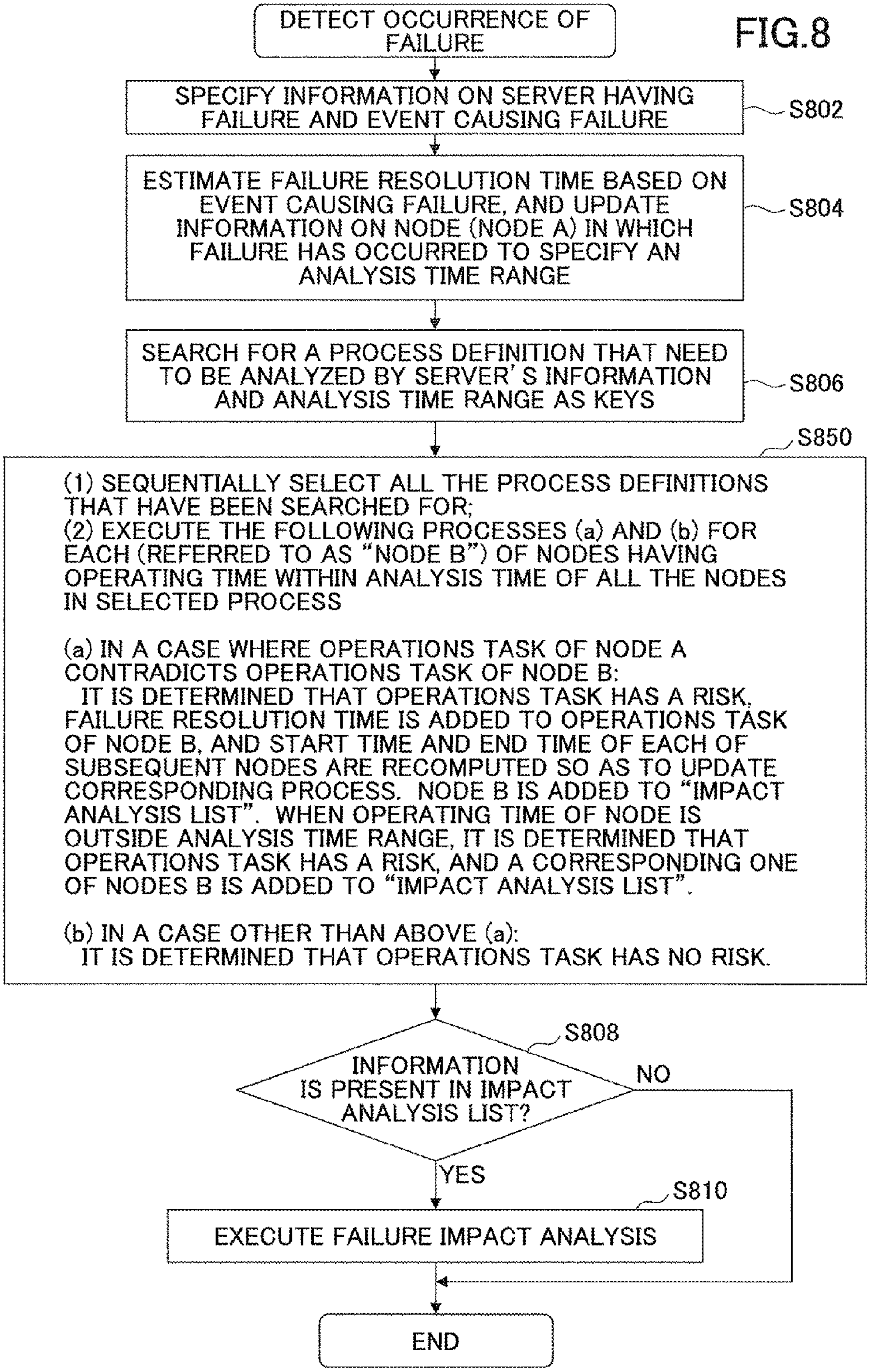
FIG. 8 is a diagram illustrating a flowchart according to an embodiment in association with an occurrence of a failure.

FIG. 8 is a flowchart according to an embodiment in association with an occurrence of a failure.

In step S802, information on the server in which a failure has occurred and an event causing the failure are specified.

In step S804, a failure resolution time is estimated based on the event causing the failure, and information on a node (refereed to as a "node A" in this example) in which the failure has occurred is updated so as to specify an analysis time range. The failure resolution time may be estimated by utilizing the mean of the previous failures of the same type that are accumulated in the DB 210 based on the event causing failure. Further, if the failure occurred is a new type failure, a predetermined default value may be employed.

Alternatively, the operator may be prompted to input a value of the failure resolution time. The start time and the end time of the node in which the failure has occurred are updated based on the estimated value of the failure resolution time. Note that the above analysis time range indicates a value utilized for determining a time range for analyzing the an occurrence of a failure. For example, the analysis time range may be determined as a time range from a current time to the failure resolution time of the node in which the failure has occurred.

In step S806, a process definition that may need to be analyzed is searched for by the server's information and the analysis time range as keys.

In step S850, the following processes may be carried out. The following step is executed for each of the nodes that are within the analysis time among all the process definitions that are searched for. Details of the step are as follows.

(1) sequentially select all the process definitions that have been searched for;

(2) execute the following processes (a) and (b) for each (referred to as a "node B" in this example) of the nodes having an operating time within the analysis time of all the nodes in the selected one of the process definitions.

(a) In a case where an operations task of the node A contradicts an operations task of the node B:

In this case, it is determined that the operations task may have a risk. Hence, the failure resolution time is added to the operations task of the node B, and the start time and the end time of each of the subsequent nodes are recomputed so as to update the corresponding process. The node B is added to the "impact analysis list". When the operating time of the node is outside the analysis time range, it is determined that the operations task has a risk, and a corresponding one of the nodes B may be added to the "impact analysis list". An "analyzed-flag" is set to the corresponding process definition.

(b) In a case other than the above (a):

In this case, it is determined that the operations task may have no risk.

In step S808, it is determined whether the information is present in the impact analysis list. When the determination in step S808 is "NO", the process is ended. When the determination in step S808 is "YES", step S810 is processed.

In step S810, a failure impact analysis is executed. Details of the failure impact analysis are described with reference to FIG. 9.

Figure 9:
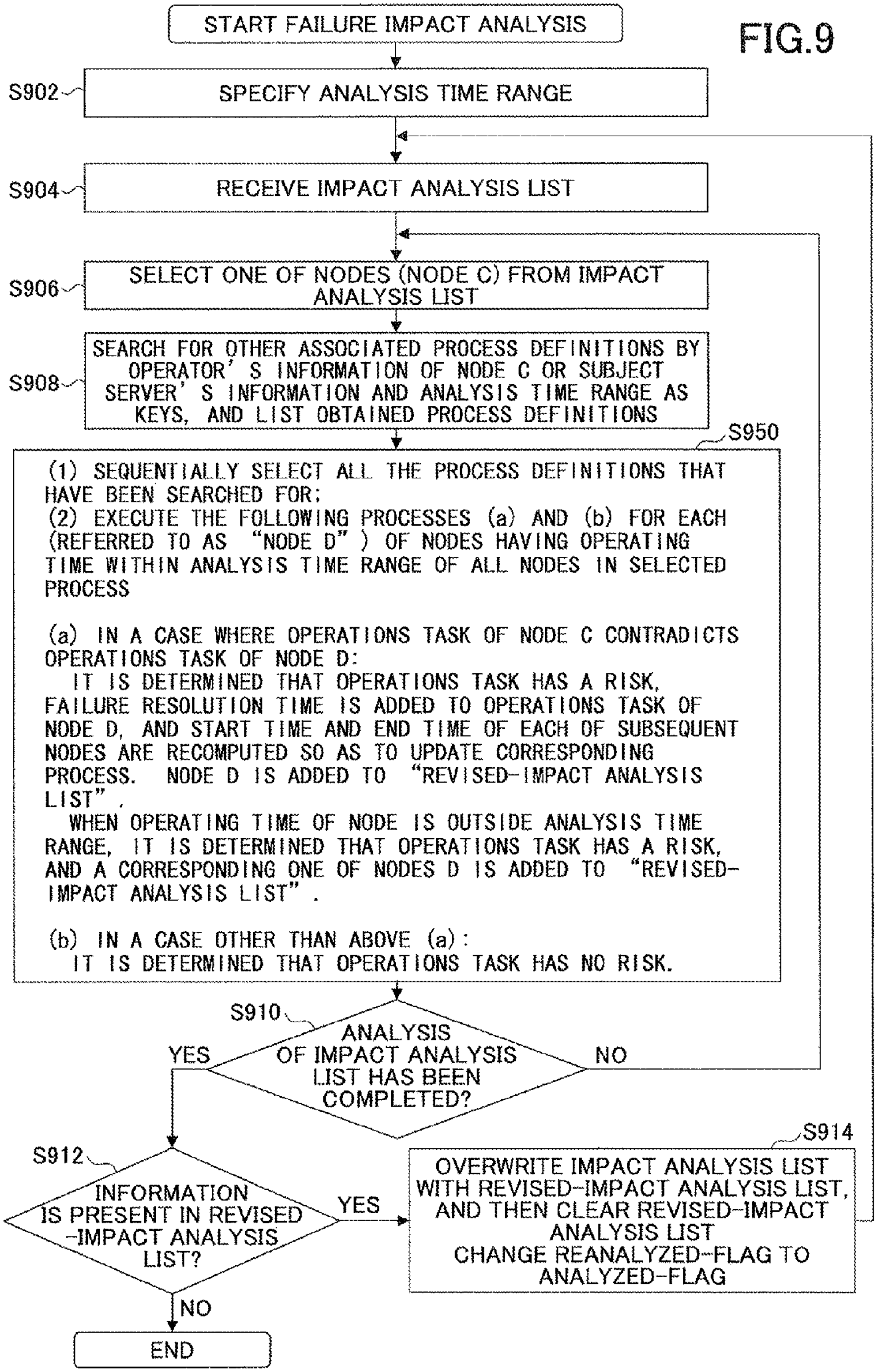
FIG. 9 is a diagram illustrating a flowchart according to an embodiment associated with an impact analysis.

FIG. 9 is a flowchart according to an embodiment associated with failure impact analysis.

In step S902, the analysis time range is specified. The analysis time range represents a specific process time range indicating an integrated time period in which an analysis is conducted. For example, the current time of the day (e.g., current time of 16:00 to a network service end time of 11:00) is set. In this case, the analysis TIME range may be predetermined. Alternatively, the operator maybe prompted to input a value when a failure has occurred.

In step S904, the impact analysis list is received. As already described above, the impact analysis list is created when the operations task is monitored as illustrated in FIG. 7, or when the failure is detected as illustrated in FIG. 8. In addition, the impact analysis list may optionally be created according to its needs.

In step S906, one of the nodes (referred to as a "node C") is selected from the impact analysis list.

In step S908, other associated process definitions are searched for by the node C operator's information or the subject server's information and the impact analysis time range as keys, and the obtained process definitions are listed. The obtained list of the process definitions is utilized in a subsequent step S950.

In step S950, the following processes may be carried out.

(1) sequentially select all the process definitions that have been searched for; (2) execute the following processes (a) and (b) for each (referred to as a "node D" in this example) of the nodes having an operating time within the impact analysis time range of all the nodes in the selected one of the process definitions.

(a) In a case where an operations task of the node C contradicts an operations task of the node D:

In this case, it is determined that the operations task may have a risk. Hence, the failure resolution time is added to the operations task of the node D, and the start time and the end time of each of the subsequent nodes are recomputed so as to update the corresponding process definition. The node D is added to the "revised-impact analysis list". When the operating time of the node is outside the analysis time range, it is determined that the operations time has a risk, and a corresponding one of the nodes D may be added to the "revised-impact analysis list". An "analyzed-flag" is set to the corresponding process definition.

(b) In a case other than the above (a):

In this case, it is determined that the operations task may have no risk.

In step S910, it is determined whether the analysis of the impact analysis list has been completed. If the determination in step S910 is "NO", step S906 is processed (back to step S906). If the determination in step S910 is "YES", step S912 is processed.

In step S912, it is determined whether the information is present in the revised-impact analysis list. If the determination in step S912 is "NO", the process is ended. If the determination in step S912 is "YES", step S914 is processed.

In step S914, the impact analysis list is overwritten with the revised-impact analysis list, which is utilized as temporary storage, and the overwritten impact analysis list is received in step S904. Thereafter, the revised-impact analysis list process is cleared.

Then, a "reanalyzed-flag" is added to the "analyzed-flag". With this process, the process definition to which the "reanalyzed-flag" is set is in the "analyzed" state. Thereafter, the above processes are repeatedly carried out. The above loop processes are continuously repeated until no information remains in the revised-impact analysis list.

According to the above processes, the nodes affected by the failure maybe extracted. The information on the nodes extracted in the above flowchart is stored in the DB 210.

Figure 10A:
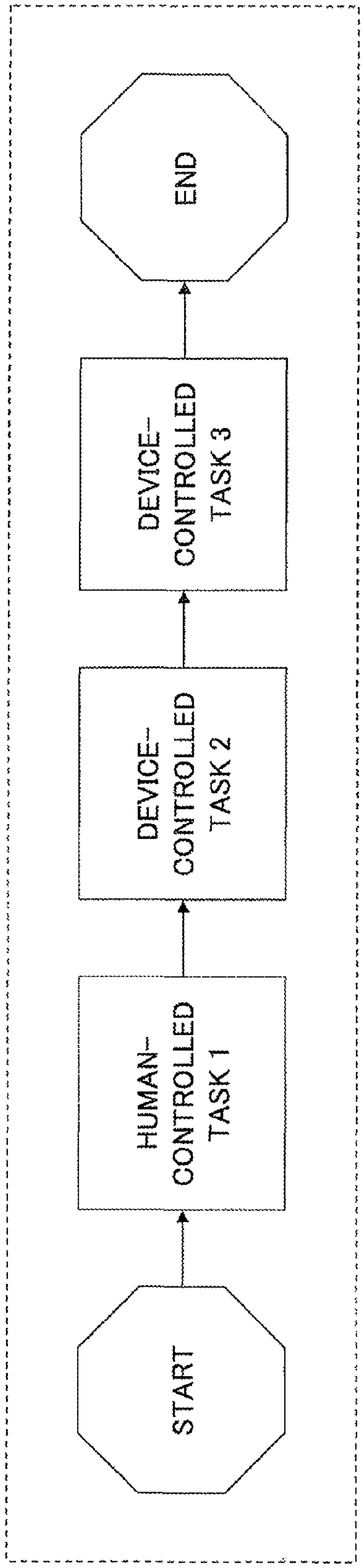
FIGS. 10A and 10B are diagrams illustrating a process definition represented by a flow and a tree structure according to an embodiment.
Figure 10B:
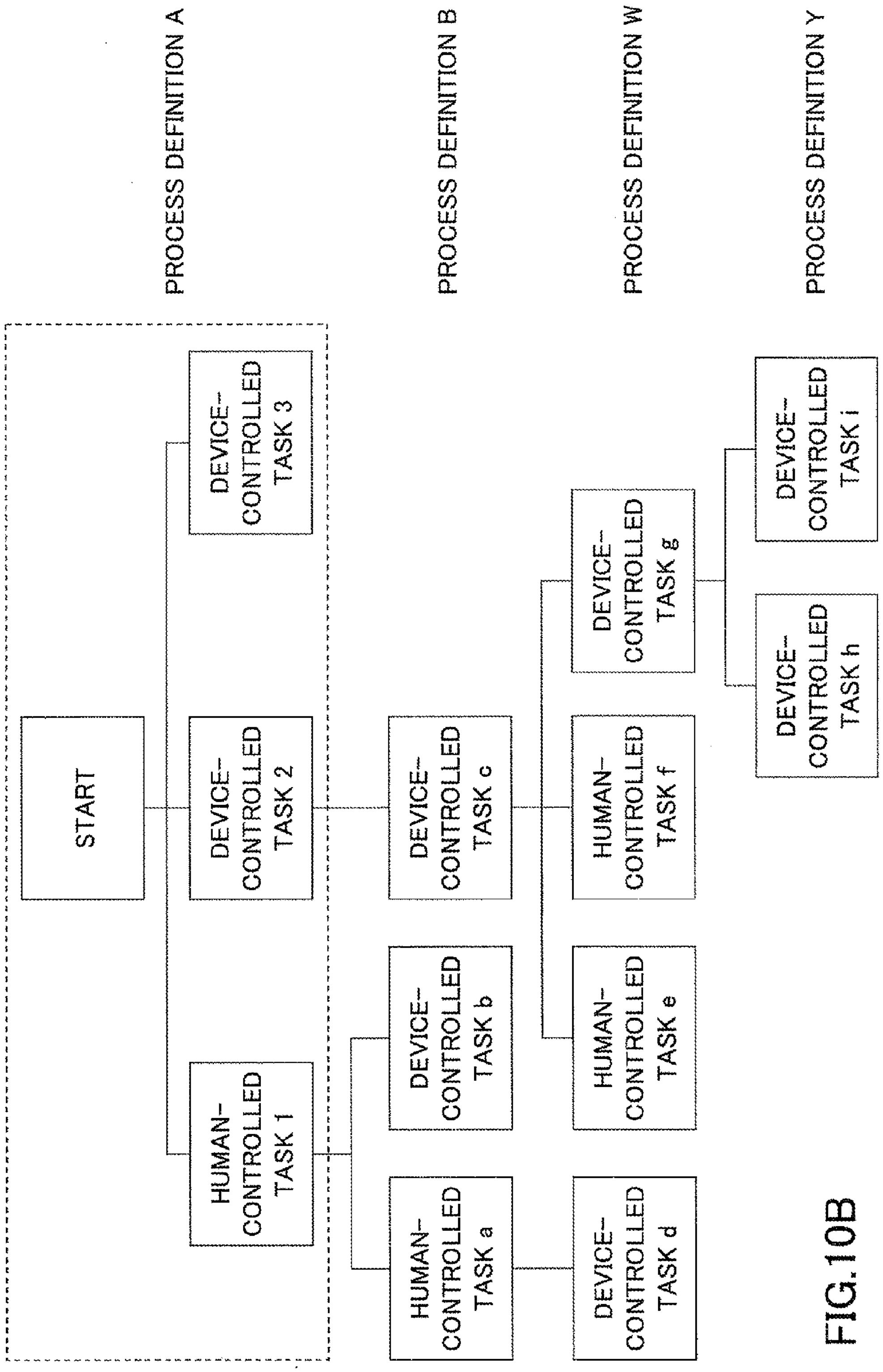

FIGS. 10A and 10B are diagrams illustrating a process definition represented by a flow and a tree structure according to an embodiment.

FIG. 10A is a diagram illustrating a process definition that is represented by a flow. FIG. 10A only illustrates a flow of the process definition; however, the process definition includes numerous information including the information illustrated in FIG. 11.

FIG. 10B is a tree structure representing a dependence relationship between the nodes. An area enclosed by a broken line indicates a tree structure of a process definition A. For example, a human-controlled task 1 of the process definition A has a dependence relationship with a human-controlled task a and a device-controlled task b of a process definition B. Various factors may be defined in the rule regulating the dependence relationships. For example, the human-controlled task 1 of the process definition A has a dependence relationship with the human-controlled task a and the device-controlled task b of a process definition B. This represents that there is a dependence relationship the human-controlled task a and the device controlled task b in that the same operator is associated with the human-controlled task a and the device controlled task b.

As illustrated in FIG. 10B, the tree structure simply represents the dependence relationships in an entire system by incorporating the human-controlled tasks and the device-controlled tasks. Further, such a tree structure may be useful for immediately grasping the affected area of the system or immediately restore the affected area of the system when a failure has occurred.

FIG. 11 is a table illustrating the dependence relationships and risks stored in the DB 210. The table includes a process definition name, a node name, and a start time and an end time of the process definition of the node. The table further includes an associated process definition name (parent), an associated node name (parent), and contradictory content. Note that the "parent" indicates one of the mutually associated nodes having the starting time earlier than the other node that is recorded in the table. One of the associated nodes having the earlier starting time is called a "parent node", and one of the associated nodes having the later starting time is called a "child node". Accordingly, a parent process definition name and a parent node name are recorded in columns of the associated process definition name (parent) and the associated node name (parent) of the corresponding child node.

In FIG. 11, details of the contradictions are recorded in columns of the contradictory content of the table. For example, a statement "an activating task to activate a VM 1 while performing a terminating task to terminate a server w" is recorded in a column of the contraction content of the process definition C. This statement indicates that the virtual machine VM 1 is operating on the server w. Thus, it may be impossible to simultaneously conduct the server w terminating task and the VM 1 activating task in an overlapped (same) time period, which indicates that there is contradiction of performing the server w terminating task and performing the VM 1 activating task at the same time.

FIG. 12 is a table illustrating examples of output information (message information) generated by the output information generating part 216. As illustrated in FIG. 12, the contents of the tasks of the process definition A are listed in the order of the start time. In addition, process definitions associated with the process definition A and the contents of the tasks of the process definition A, and message information are listed.

For example, a message, "Alert! There are two or more tasks at the same time" illustrated in a column of the message information 1202 is displayed. The operator 1 is expected to carry out "task application" as an operations task of the process definition A at 13:00 while the operator 1 is also expected to carry out "monitoring the server" of the associated process definition B at the same time of 13:00. Hence, the operator 1 is expected to simultaneously carry out two operations tasks that the operator 1 may fail to achieve.

Further, a message, "Alert! There is task contradiction in server x" illustrated in a column of the message information 1204 is displayed. In the process definition A, a server x may need stop the server x itself. In the same time period, the server x is expected to transmit electronic mail (email) to an administrator in the process D. In this case, the server x maybe highly likely to fail to transmit the email. Hence, there is a risk of failing to transmit the email in this case.

As described above, the operator may be able to easily grasp dependence relationships between the operations tasks while easily detecting a critical risk in an environment in which two or more process definitions are running in parallel via a user interface. The risk may be prevented or the accidental failure may be immediately and easily resolved by acquiring the above information.

Figure 13:
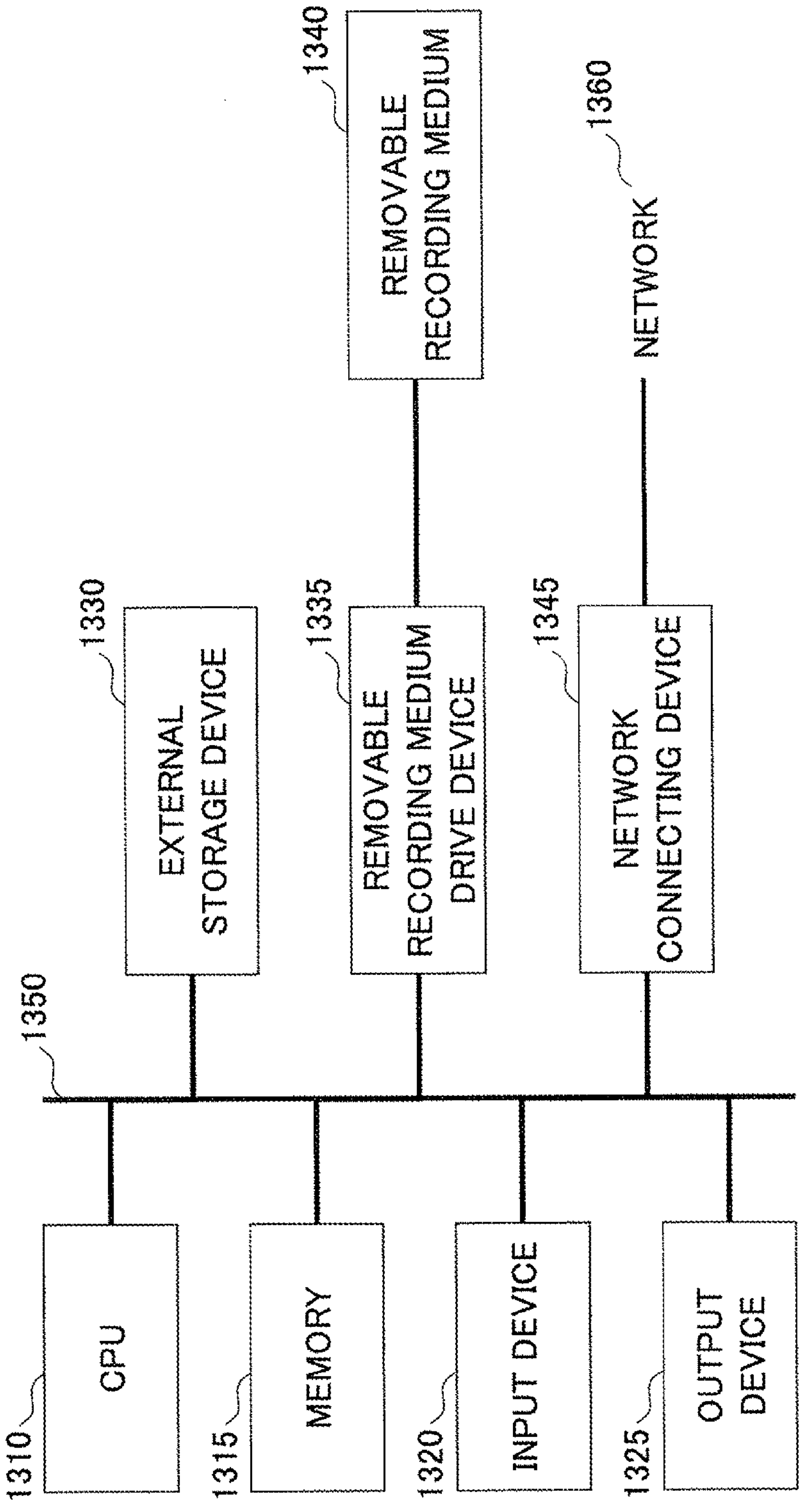
FIG. 13 is a diagram illustrating a hardware configuration according to an embodiment.

FIG. 13 illustrates an example of a hardware configuration according to an embodiment. The hardware includes a central processing unit (CPU) 1310, memory 1335, an input device 1320, and output device 1325, an external storage device 1330, a removable recording medium drive device 1335, and a network connecting device 1345. The above components are mutually connected via a bus 1350. The removable recording medium drive device 1335 may be able read or write removable recording medium 1340. The network connecting device 1345 is connected to the network 1360.

Note that a program according to an embodiment maybe stored in the removable recording medium 1340. The removable recording medium 1340 indicates at least one non-transitory and tangible recording medium having a structure. Examples of the removable recording medium 1340 includes a magnetic recording medium, an optical disk, a magneto-optical recording medium, and a nonvolatile memory. Examples of the magnetic recording medium include a hard disk drive (HDD), a flexible disk (FD), and a magnetic tape (MT). Examples of the optical disk include a digital versatile disc (DVD), a digital versatile disc random access memory (DVD-RAM), a compact disc-read only memory (CD-ROM), and a compact disc-recordable/rewritable memory (CD-R/CD-RW). Examples of the magneto-optical medium include a magneto-optical (MO) disk and the like.

According to one aspect of the invention plural operations tasks may be appropriately managed.

Note that all or part of the elements of the above embodiments maybe combined in various manners. Therefore, the invention defined in the claims is not limited to the configurations of the embodiments.

Further, the elements of a method invention, a program invention, and an invention of a non-transitory recording medium may be switched insofar as there will be no contradiction. It is needless to say that the embodiments having the switched elements are all contained within the technical scope of the claimed invention. Further, it is needless to say that the configurations that are not disclosed in the specification of the present application but are within the competence of the person skilled in the art are all contained within the technical scope of the claimed invention.

The disclosed technologies are described according to the first and second embodiments; however, the disclosed technologies are not limited to the disclosed embodiments. Various modifications or alterations may be made within the scope of the inventions described in the claims. Further, combinations of all or part of the components of aforementioned embodiments may be applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. An operation task managing apparatus including an input device, an output device, a memory, and a processor utilizing the memory and configured to execute a process, the process comprising:

receiving, from the input device, information of an operations task including a plurality of tasks including a device task and a human task, and an order of the plurality of the tasks;

determining an operating time of each of the tasks based on a time determination rule;

generating a plurality of process definitions each having the determined operating time in association with a corresponding one of the tasks including the device task and the human task;

determining whether there is an overlapped operating time, in accordance with a dependence relationship between the tasks based on the process definitions and an analysis rule;

extracting one or more tasks having a risk by determining that the risk exists when the determining determines that there is the overlapped operating time;

generating an output list listing the plurality of tasks in time series and indicating risk information for the one or more tasks; and outputting the output list including the risk information to the output device, the extracting includes determining that a current task in execution is delayed further than expected when a difference between a start time of the current task in execution and the start time of the current task described in the process definition exceeds a delay threshold, and adding the current task in an impact analysis list;

updating the start time and an end time each of subsequent tasks of the current task;

determining the presence of the risk when a time acquired by adding a resolution time to the operating time is outside an analysis time range with respect to one or more second tasks in a first process definition of the plurality of the process definitions, in which the analysis time range is defined from a current time to a resolution time of a first task, the one or more second tasks are planned in the analysis time range, and the first process is related to the first task selected from the impact analysis list, and adding the one or more second tasks to a revised-impact analysis list; and overwriting the impact analysis list with the revised-impact analysis list after the determining the presence of the risk is conducted with respect to each of the one or more second tasks in each of second process definitions related to the first task, and repeating until an end of the second process definition, wherein the output list includes information related to the first task in the impact analysis list.

2. The operation task managing apparatus as claimed in claim 1, wherein in the extracting process, the dependence relationship is extracted by utilizing a rule including determining one of device identification and human identification between the tasks as the analysis result.

3. The operation task managing apparatus as claimed in claim 1, wherein in the extracting process, at least one of the risks is extracted by utilizing a rule including determining one of task contradiction, an increase in task load, and an increase in operating time in the tasks as the analysis result.

4. The operation task managing apparatus as claimed in claim 1, wherein the time determination rule is utilized for determining the operating time based on information of one of a predefined default value and a previous operating time.

5. The operation task managing apparatus as claimed in claim 1, wherein the process further includes activating the extracting process at a predetermined time.

6. The operation task managing apparatus as claimed in claim 1, wherein the process definition generating process includes a process of correcting the generated process definitions in response to at least one of an event occurrence including an occurrence of a failure and extraction of the at least one of the risks by the extraction part, and the corrected process definitions are transmitted to the extraction part.

7. An operation task managing method comprising:

receiving, from an input device, information of an operations task including a plurality of tasks including a device task and a human task, and an order of the plurality of the tasks;

determining an operating time of each of the tasks based on a time determination rule;

generating a plurality of process definitions each having the determined operating time in association with a corresponding one of the tasks including the device task and the human task;

determining whether there is an overlapped operating time, in accordance with a dependence relationship between the tasks based on the process definitions and an analysis rule;

extracting one or more tasks having a risk by determining that the risk exists when the determining determines that there is the overlapped operating time;

generating an output list listing the plurality of tasks in time series and indicating risk information for the one or more tasks; and outputting the output list including the risk information to an output device, the extracting includes determining that a current task in execution is delayed further than expected when a difference between a start time of the current task in execution and the start time of the current task described in the process definition exceeds a delay threshold, and adding the current task in an impact analysis list;

updating the start time and an end time each of subsequent tasks of the current task;

determining the presence of the risk when a time acquired by adding a resolution time to the operating time is outside an analysis time range with respect to one or more second tasks in a first process definition of the plurality of the process definitions, in which the analysis time range is defined from a current time to a resolution time of a first task, the one or more second tasks are planned in the analysis time range, and the first process is related to the first task selected from the impact analysis list, and adding the one or more second tasks to a revised-impact analysis list; and overwriting the impact analysis list with the revised-impact analysis list after the determining the presence of the risk is conducted with respect to each of the one or more second tasks in each of second process definitions related to the first task, and repeating until an end of the second process definition, wherein the output list includes information related to the first task in the impact analysis list.

8. The operation task managing method as claimed in claim 7, wherein in the extracting process, the dependence relationship is extracted by utilizing a rule including determining one of device identification and human identification between the tasks as the analysis result.

9. The operation task managing method as claimed in claim 7, wherein in the extracting process, at least one of the risks is extracted by utilizing a rule including determining one of task contradiction, an increase in task load, and an increase in operating time in the tasks as the analysis result.

10. The operation task managing method as claimed in claim 7, wherein the time determination rule is utilized for determining the operating time based on information of one of a predefined default value and a previous operating time.

11. The operation task managing method as claimed in claim 7, further comprising activating the extracting process at a predetermined time.

12. The operation task managing method as claimed in claim 7, wherein the process definition generating process includes a process of correcting the generated process definitions in response to at least one of an event occurrence including an occurrence of a failure and extraction of the at least one of the risks by the extraction part, and the corrected process definitions are transmitted to the extraction part.

13. A non-transitory computer-readable recording medium storing therein an operation task managing program that causes a computer to execute a process comprising:

receiving, from an input device, information of an operations task including a plurality of tasks including a device task and a human task, and an order of the plurality of the tasks;

determining an operating time of each of the tasks based on a time determination rule;

generating a plurality of process definitions each having the determined operating time in association with a corresponding one of the tasks including the device task and the human task;

determining whether there is an overlapped operating time, in accordance with a dependence relationship between the tasks based on the process definitions and an analysis rule;

extracting one or more tasks having a risk by determining that the risk exists when the determining determines that there is the overlapped operating time;

generating an output list listing the plurality of tasks in time series and indicating risk information for the one or more tasks; and outputting the output list including the risk information to an output device, the extracting includes determining that a current task in execution is delayed further than expected when a difference between a start time of the current task in execution and the start time of the current task described in the process definition exceeds a delay threshold, and adding the current task in an impact analysis list;

updating the start time and an end time each of subsequent tasks of the current task;

determining the presence of the risk when a time acquired by adding a resolution time to the operating time is outside an analysis time range with respect to one or more second tasks in a first process definition of the plurality of the process definitions, in which the analysis time range is defined from a current time to a resolution time of a first task, the one or more second tasks are planned in the analysis time range, and the first process is related to the first task selected from the impact analysis list, and adding the one or more second tasks to a revised-impact analysis list; and overwriting the impact analysis list with the revised-impact analysis list after the determining the presence of the risk is conducted with respect to each of the one or more second tasks in each of second process definitions related to the first task, and repeating until an end of the second process definition, wherein the output list includes information related to the first task in the impact analysis list.

14. The non-transitory recording medium as claimed in claim 13, wherein in the extracting process, the dependence relationship is extracted by utilizing a rule including determining one of device identification and human identification between the tasks as the analysis result.

15. The non-transitory recording medium as claimed in claim 13, wherein in the extracting process, at least one of the risks is extracted by utilizing a rule including determining one of task contradiction, an increase in task load, and an increase in operating time in the tasks as the analysis result.

16. The non-transitory recording medium as claimed in claim 13, wherein the time determination rule is utilized for determining the operating time based on information of one of a predefined default value and a previous operating time.

17. The non-transitory recording medium as claimed in claim 13, the procedure further comprising activating the extracting process at a predetermined time.

18. The non-transitory recording medium as claimed in claim 13, wherein the process definition generating process includes a process of correcting the generated process definitions in response to at least one of an event occurrence including an occurrence of a failure and extraction of the at least one of the risks by the extraction part, and the corrected process definitions are transmitted to the extraction part.

* * * * *